United States Patent [19]

Nakamura et al.

[11] Patent Number: 5,589,975
[45] Date of Patent: Dec. 31, 1996

[54] OPTICAL AMPLIFICATION SYSTEM

[75] Inventors: Kazunori Nakamura, Yokohama, Japan; I. Kou Tei, Ontario, Canada

[73] Assignee: The Furukawa Electric Co., Ltd., Tokyo, Japan

[21] Appl. No.: 334,444

[22] Filed: Nov. 4, 1994

Related U.S. Application Data

[63] Continuation of Ser. No. 885,956, May 20, 1992, abandoned.

[30] Foreign Application Priority Data

May 20, 1991 [JP] Japan ................................ 3-143792

[51] Int. Cl.⁶ ........................... G02B 6/00; H01S 3/131; H04B 9/00
[52] U.S. Cl. .................... 359/345; 359/341; 359/348; 372/71
[58] Field of Search ........................ 359/176, 177, 359/341, 345, 348; 606/12; 372/71

[56] References Cited

U.S. PATENT DOCUMENTS

| | | | |
|---|---|---|---|
| 3,887,876 | 6/1975 | Zeidler | 359/345 |
| 4,058,774 | 11/1977 | Hughes | 359/348 |
| 4,812,776 | 3/1989 | Sasaki | 359/177 |
| 4,879,761 | 11/1989 | Webb | 359/176 |
| 4,979,234 | 12/1990 | Agraval et al. | 455/608 |
| 5,003,268 | 3/1991 | Tsuchiya | 359/345 |
| 5,017,885 | 5/1991 | Saleb | 359/345 |
| 5,025,142 | 6/1991 | Aoshima et al. | 359/345 |
| 5,117,303 | 5/1992 | Deservire et al. | 359/341 |
| 5,177,634 | 1/1993 | Way | 359/341 |

FOREIGN PATENT DOCUMENTS 2094867  11/1993  Canada.

OTHER PUBLICATIONS

Tomofuji, H. et al, "Cumulative Waveform Distortion in Cascaded Optical Amplifier Repeaters for Multigigabit IM/DD Systems", OEC '90, Tokyo, 1990.

Laning et al, IEEE Photonics Technology Lett., (USA), vol. 3, No. 3, pp. 253–255, Mar. 1991.

*Primary Examiner*—Nelson Moskowitz
*Attorney, Agent, or Firm*—Jacobson, Price, Holman & Stern, PLLC

[57] ABSTRACT

An optical amplification system capable of operating without being affected by the waveform of the incoming optical signal is provided for amplifying the optical signal in its optical waveguide by the effect of stimulated emission of a fluorescent substance induced by pumped light. According to a first aspect of the invention, an optical amplification system turns on its pumping source 8 when there is an optical signal s1 in the optical waveguide 5 whereas the pumping source 8 is kept off as long as no optical signal s1 is found in the optical waveguide 5 so that, when the pumping source 8 is turned on, pumped light from the pumping source 8 is fed to the optical waveguide 5 with a delay of time relative to the incoming optical signal s1. According to a second aspect of the invention, the inside of the optical waveguide 5 is constantly kept under an excited condition so that, when no optical signal s1 is found in the optical waveguide 5, dummy light s3 is fed to the optical waveguide 5, whereas no dummy light s3 is fed to the optical waveguide 5 once an optical signal s1 is introduced to the optical waveguide 5. With such an arrangement, since no optical amplification takes place at the rising edge of an incoming optical signal and hence the operation of optical amplification is not dependent on the waveform of the incoming optical signal, a safe and stable optical amplification system can be established.

4 Claims, 7 Drawing Sheets

OPTICAL AMPLIFICATION SYSTEM

This application is a continuation of application Ser. No. 07/885,956, filed May 20, 1992, now abandoned.

BACKGROUND OF THE INVENTION

1. Field of the Invention

This invention relates to an optical amplification system suitably used for compensation of transmission loss and improvement of signal reception sensitivity by using an optical waveguide having a capability of optical amplification by optical pumping.

2. Prior Art

Optical amplification systems using optical fibers having an optical amplification capability have been known and utilized as means for switching optical transmission lines in optical CATV systems and other practical applications.

There has been reported that light of 1.55 μm band can be effectively amplified by using a silicate glasses single mode optical fiber having an erbium (Er)-doped core in an optical amplification system of the above described type.

As illustrated in FIG. 9 of the accompanying drawings, an optical amplification system under consideration normally comprises a pumping source 31 for optical pumping, an optical combiner 32 for combining optical signals and pumped light and an optical fiber 33 having an rare earth element-doped core 33, to which an optical isolator 34 is added.

A known optical amplification system as shown in FIG. 9 normally shows a rise of excitation level in the optical fiber 33 when pumped light is introduced into the optical fiber 33 and amplifies light signals fed to the optical fiber 33 as it returns to a normal state from the raised excitation level.

Such an optial optical amplification system has a large gain and a high response speed and therefore is capable of adapting itself to an ultra-high speed transmission environment.

However, if no light signal is existent in the optical fiber 33 for a considerable period of time, e.g. several milliseconds, under a condition where pumped light is constantly being introduced to the optical fiber 33, the excitation level in the optical fiber 33 is raised further so that the light signal introduced in the optical fiber 33 under this condition is amplified by a large amplification factor accordingly.

Thus, if the optical fiber 33 remains under a condition where no optical signal is entered into it for a long period of time and immediately thereafter an optical signal is introduced there, the optical signal will be amplified by a very large amplification factor to generate intense optical pulses, which by turn can destruct and/or saturate the downstream systems.

FIGS. 10(A) and 10(B) of the accompanying drawings illustrate waveforms obtained when a known optical amplification system is used for a line switching system, Of these illustrations, the waveform of FIG. 10(B), which is obtained before it is optically amplified, shows that the rising edge of the signal is amplified to generate strong pulses as may be more clearly seen when compared with that of FIG. 10(B) obtained after the optical amplification.

In view of the above described problem of the prior art, it is therefore an object of the present invention to provide an optical amplification system that can operate properly regardless of the waveform of the incoming signal.

SUMMARY OF THE INVENTION

According to a first aspect of the present invention, the above object is achieved by providing an optical amplification system comprising an optical amplifier unit having an optical waveguide capable of amplifying optical signals transmitted through said optical waveguide by means of the effect of optical amplification produced in the optical waveguide when pumped light is fed to said optical waveguide, wherein pumped light is fed to said optical waveguide only when an optical signal is transmitted through said optical waveguide whereas no pumped light is fed to said optical waveguide as long as no optical signal is transmitted through said optical waveguide.

In an optical amplification system according to the first aspect of the invention, auxiliary pumped light is preferably fed to the optical waveguide on a constant basis in order to enhance the responsiveness of the system for optical amplification.

The optical amplifier unit of an optical amplification system according to the first aspect of the invention preferably comprises, besides the optical waveguide for optical amplification, an optical combiner for feeding the optical waveguide with pumped light, a pumping source for generating pumped light and a drive circuit for driving said pumping source. Alternatively, the optical amplifier unit of an optical amplification system according to the invention may comprise an optical waveguide for optical amplification, an optical switch for turning on and off the pumped light fed to the optical waveguide, a pumping source for generating pumped light and a drive circuit for driving said pumping source.

In order to enhance the responsiveness of the system for optical amplification, a bias power source is preferably connected to the pumping source of the optical amplifier unit of an optical amplification system according to the invention. Alternatively, it is preferable that the optical amplifier unit comprises an auxiliary pumping source and a drive circuit for driving the auxiliary pumping source. Still alternatively, it is preferable that an auxiliary optical pumping unit is arranged downstream to the optical amplifier unit in order to fed auxiliary pumped light to the optical waveguide in a direction reverse to that of transmission of optical signals. The auxiliary optical pumping unit may be replaced by an auxiliary optical amplifier unit of a steadily operating type arranged upstream and connected to the optical amplifier unit.

According to a second aspect of the present invention, the above object is achieved by providing an optical amplification system comprising an optical amplifier unit having an optical waveguide capable of amplifying optical signals transmitted through said optical waveguide by means of the effect of optical amplification produced in the optical waveguide when pumped light is fed to said optical waveguide, wherein pumped light is constantly fed to said optical waveguide for steady excitation and a dummy optical signal is applied to the optical waveguide whenever no optical signal is transmitted through the optical waveguide whereas no dummy optical signal is applied to the optical waveguide as long as an optical signal is transmitted through the optical waveguide.

The optical amplifier unit of an optical amplification system according to the second aspect of the invention comprises, besides the optical waveguide for optical amplification, a pumping source for generating pumped light and a drive circuit for driving said pumping source and a dummy optical signal source is arranged upstream and connected to the optical amplifier unit by way of an optical switch.

With an optical amplification system according to the first aspect of the invention, pumped light is fed to said optical waveguide only when an optical signal is transmitted through said optical waveguide whereas no pumped light is fed to said optical waveguide as long as no optical signal is transmitted through said optical waveguide.

The pumped light fed to the optical waveguide goes into the waveguide shortly after an optical signal is transmitted into the optical waveguide. Therefore, no optical amplification takes place in the optical waveguide when there is a rising edge of an optical signal in the optical waveguide and consequently the effect of optical amplification of the unit is not affected by the waveform of the optical signal being transmitted therethrough, The optical waveguide will find itself in a highly excited condition when properly pumped light is fed to optical waveguide of the above optical amplification system while auxiliary pumped light is being fed there. Consequently, the stability and the responsiveness of the system will be so much more improved.

With an optical amplification system according to the second aspect of the invention, pumped light is constantly fed to said optical waveguide for steady excitation and dummy optical signal is applied to the optical waveguide whenever no optical signal is transmitted through the optical waveguide whereas no dummy optical signal is applied to the optical waveguide as long as an optical signal is transmitted through the optical waveguide.

In other words, the optical waveguide of this optical amplification system is operating under a saturated condition and a dummy optical signal is applied to the optical waveguide whenever no optical signal is transmitted therethrough so that it normally operates even when the dummy optical signal is replaced by a proper optical signal.

Consequently the effect of optical amplification of this unit is not affected either by the waveform of the optical signal being transmitted therethrough.

Now, the present invention will be described by referring to the accompanying drawings that illustrates preferred embodiments of the invention.

BRIEF DESCRIPTION OF THE INVENTION

DETAILED DESCRIPTION OF THE INVENTION

Firstly, a first embodiment of the invention will be described by referring to FIG. 1.

Figure 1:
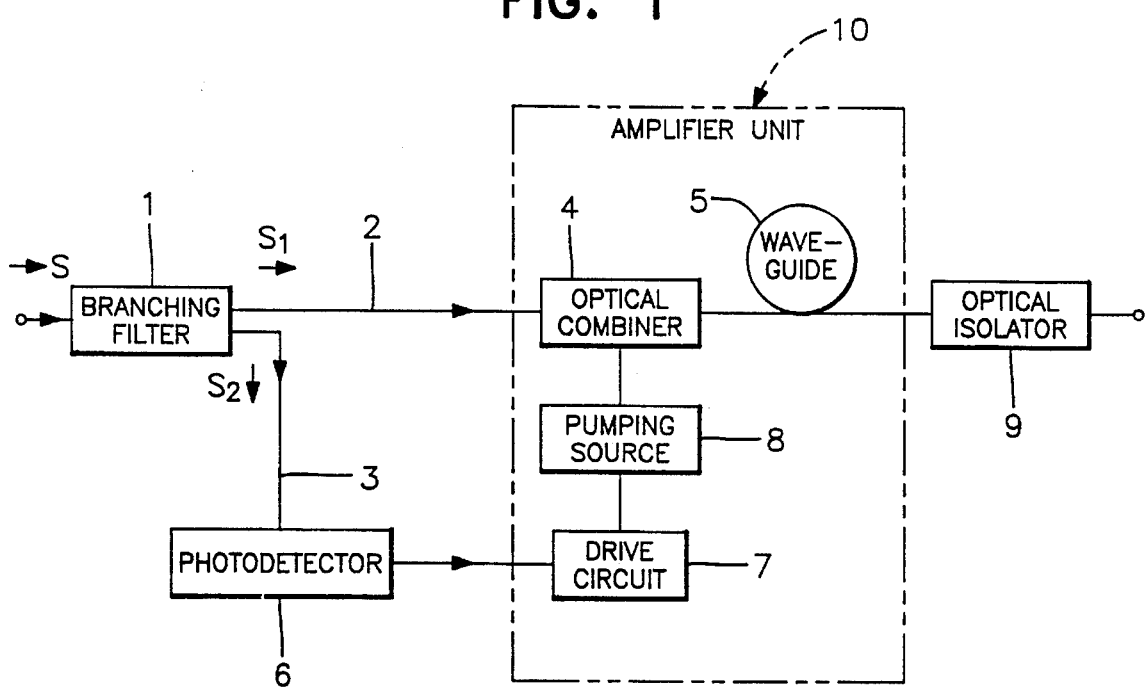
FIG. 1 is a block diagram of a first embodiment of an optical amplification system according to the invention.

The optical amplification system illustrated in FIG. 1 comprises an optical transmission route constituted by an optical branching filter 1, an optical transmission line 2, an optical combiner 4, an optical waveguide 5 and an optical isolator 9 and a photoelectric conversion route constituted by the optical branching filter 1, an optical transmission line 3, a photodetector 6, a drive circuit 7, a pumping source 8.

The optical branching filter 1 typically comprises a beam splitter that splits the incoming signal light to a ratio of, for instance, 1:20.

The optical transmission lines 2, 3 are typically silicate glass-type covered optical fibers comprising a core and a clad.

The optical combiner 4 is typically a photocoupler, e.g., a wave division module (WDF), for combining signal. light and pumped light.

The optical waveguide 5 for optical amplification is typically a silicate glass- or fluoride glass-type single mode optical fiber comprising a core and a clad and coated with a plastic material.

The core of the optical waveguide 5 is made of silicate- or fluoride-type host glass to which one or more than one rare earth element such as erbium (Er) and praseodymium (Pr) are added. Additionally, one or more than one substance selected from a group of substances including alkaline earth elements such as beryllium (Be), oxides of yittrium-aluminum-garnet (YAG) crystals, oxides $BaF_2$, $AlF_3$ and/or $NdF_3$.

The clad of the optical waveguide 5 is also made of silicate- or fluoride-type glass containing one or more than one doping substances as described above and obviously has a refractive index smaller than theft of the core.

The detector 6 is of a known type comprising photodiodes (PD) and the drive circuit 7 is an appropriate electric circuit incorporating a commercial power supply.

The pumping source 8 typically comprises a semiconductor laser capable of oscillating to emit light with a required frequency band which is absorption frequency band of the dopant material (Er, Pr, . . . ) such as a 0.8 μm band, 0.98 μm band or 1.48 μm band in the case of Er dopant.

The optical isolator 9 is an optical device having no polarization sensitivity that can effectively suppress oscillation of the amplifier (optical waveguide 5) due to reflection of light or some other cause, The optical amplification system as illustrated in FIG. 1 operates to amplify optical signals in a manner as described below.

Referring to FIG. 1, an incoming optical signal s is divided into two optical signals s1 and s2 (s1: s2=20:1) by the optical branching filter 1. Thereafter, the two optical signals s1 and s2 are led to their respective optical transmission lines 2, 3 and then the former proceeds to the optical waveguide ($Er^{3+}$ doped optical fiber) 5 by way of the optical combiner 4 while the latter is converted to an electric signal by the photodetector 6 and led to the drive circuit 7.

The drive circuit 7 is activated only when it receives an electric signal from the photodetector 6 to drive (turn on) the pumping source 8 and remains inactive as long as it does not receive any electric signal from the photodetector 6 to leave the pumping source 8 also inactive.

As the pumping source 8 is driven to operate by the drive circuit 7, it emits pump light which is led to the optical waveguide 5 by way of the optical combiner 4.

Under this condition, since the relaxation time of pumped electrons is approximately 10 ms, activation of the optical amplification system is delayed by this time span. If necessary, it may be delayed further by using the drive circuit 7.

As the optical amplification system of FIG. 1 operates in the above described manner, it does not amplify the optical signal s1 at the rising edge in the optical waveguide 5 and starts amplifying the signal s1 only slightly after the rising edge is gone.

Consequently, the optical amplification system is free from the problem described earlier and performs its expected proper operations.

Figure 2:
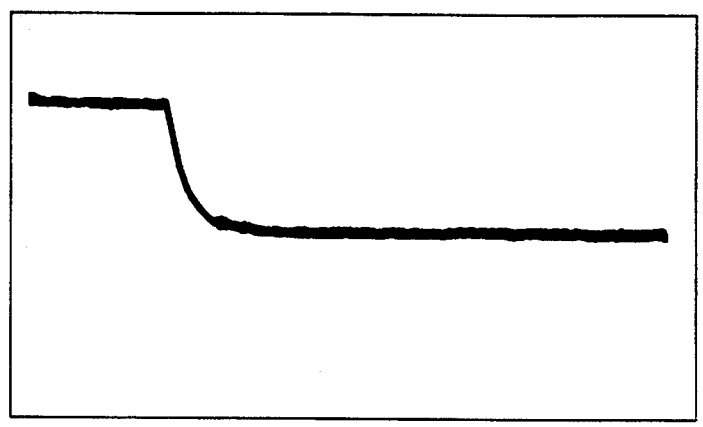
FIG. 2 is a graph showing the waveform of an optical signal applied to the embodiment of FIG. 1 before the signal is amplified.

FIG. 2 is a graph of the waveform of an optical signal obtained when an optical amplification system as illustrated in FIG. 1 is used for a line switching system and before the signal is amplified.

Figure 10A:
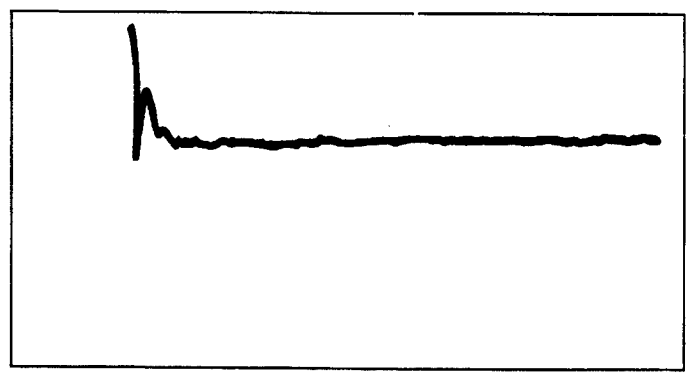
FIG. 10(A) is a graph showing the waveform of an optical signal applied to a conventional optical amplification system before the signal is amplified.
Figure 10B:
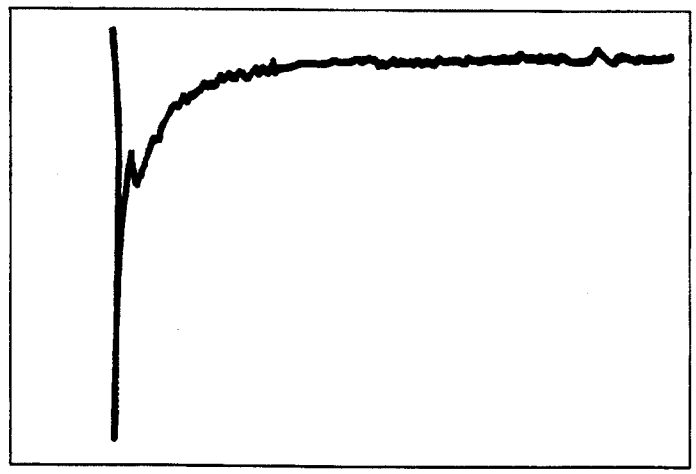
FIG. 10(B) is a graph showing the waveform of an optical signal amplified by a conventional optical amplification system.

Comparing FIG. 2 and FIG. 10(B), it is clear that optical amplification system of FIG. 1 does not respond the rising edge of the incoming optical signal.

Figure 3:
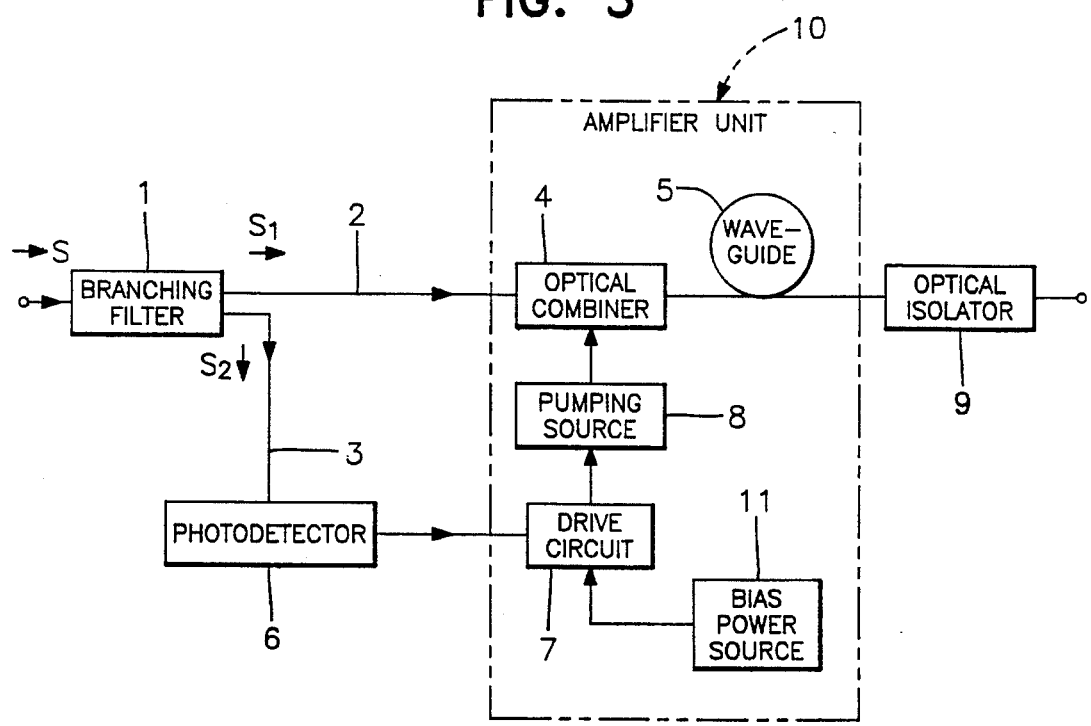
FIG. 3 is a block diagram of the first embodiment, to which certain modifications are made.

FIG. 3 is a block diagram of the first embodiment, to which certain modifications are made.

In this modified embodiment, a bias power source 11 is connected to the pumping source 8 of the optical amplifier unit 10 in order to enhance the responsiveness of the optical waveguide 5 for optical amplification.

With this arrangement, since the pumping source 8 is constantly ready to play its role in optical amplification at a low level as it receives a bias current from the bias power source 11 even when no optical signal s2 is applied thereto and therefore the drive circuit 7 remains inactive, the optical waveguide 5 can perform an operation of optical amplification using the excitation energy supplied from the bias power source 11 in advance even if there is a delay of arrival of pumped light from the pumping source 8 driven by the drive circuit 7 which is activated by an optical signal s2. Thus, this modified embodiment can starts an operation of optical amplification simultaneously with the rising edge of an incoming optical signal s1 without missing any initial parts of the optical signal.

While auxiliary pumped light generated when a bias current is applied to the pumping source 8 has a wavelength identical with or very close to that of principal pumped light, its output level is by far lower than that of the principal pumped light because the optical waveguide 5 is only weakly excited.

Now, a second embodiment of the invention will be described by referring to FIG. 4.

Figure 4:
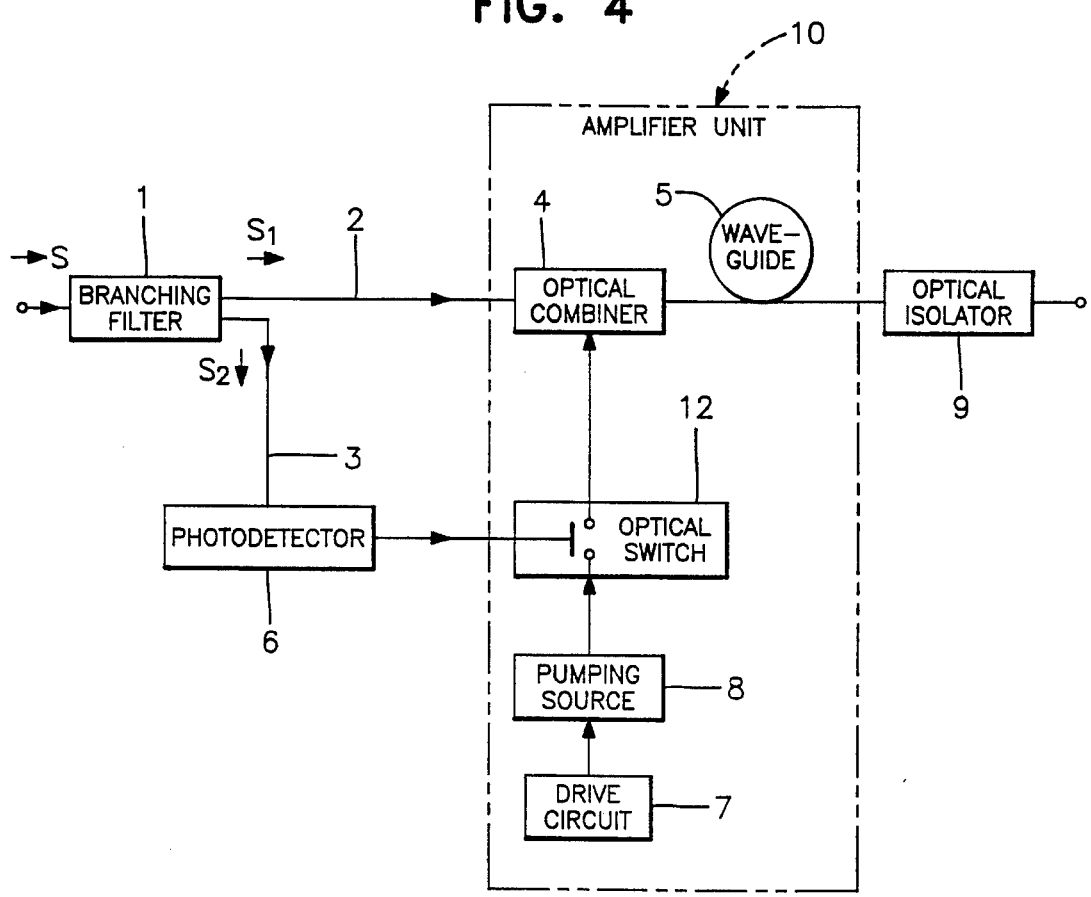
FIG. 4 is a block diagram of a second embodiment of the invention.

An optical amplification system as illustrated in FIG. 4 differs from the one show in FIG. 1 only in that its optical amplifier unit 10 additionally comprises an optical switch 12 and its photodetector 6 is connected to the optical switch 12, while its remaining technical features is essentially same as those of the first embodiment.

In the optical amplification system of FIG. 4, the pumping light 8 is constantly kept in an on-state whereas the optical switch 12 is kept in an off-state by the photodetector 6 as long as there is no optical signal s in the system.

As an incoming optical signal s is detected in the system, the optical branching filter 1 divides it into two optical signals s1 and s2, which are then led to the respective optical transmission lines 2 and 3. The former signal s1 is then sent to the optical waveguide 5 by way of the optical combiner 4, while the latter signal s2 is converted to an electric signal by the photodetector 6 and applied to the optical switch 12.

As the optical switch 12 is turned on by the control optical signal s2 transmitted from the photodetector 6, it allows pumped light from the pumping source 8 to enter the optical waveguide 5 by way of the optical combiner 4.

Note that, in this embodiment again, the photodetector 6 is activated by a control optical signal s2 so that pumped light reaches the optical waveguide 5 behind the incoming optical signal s1 with a delay of time required for switching the optical switch 12 by a detection signal from the photodetector 6.

Thus, the optical amplification system of FIG. 4 does not amplify the rising edge of the optical signal s1 entered into the optical waveguide 5 and starts amplifying the signal s1 only slightly after the rising edge is gone and, therefore, it is free from the problem described earlier and performs its expected proper operations.

Figure 5:
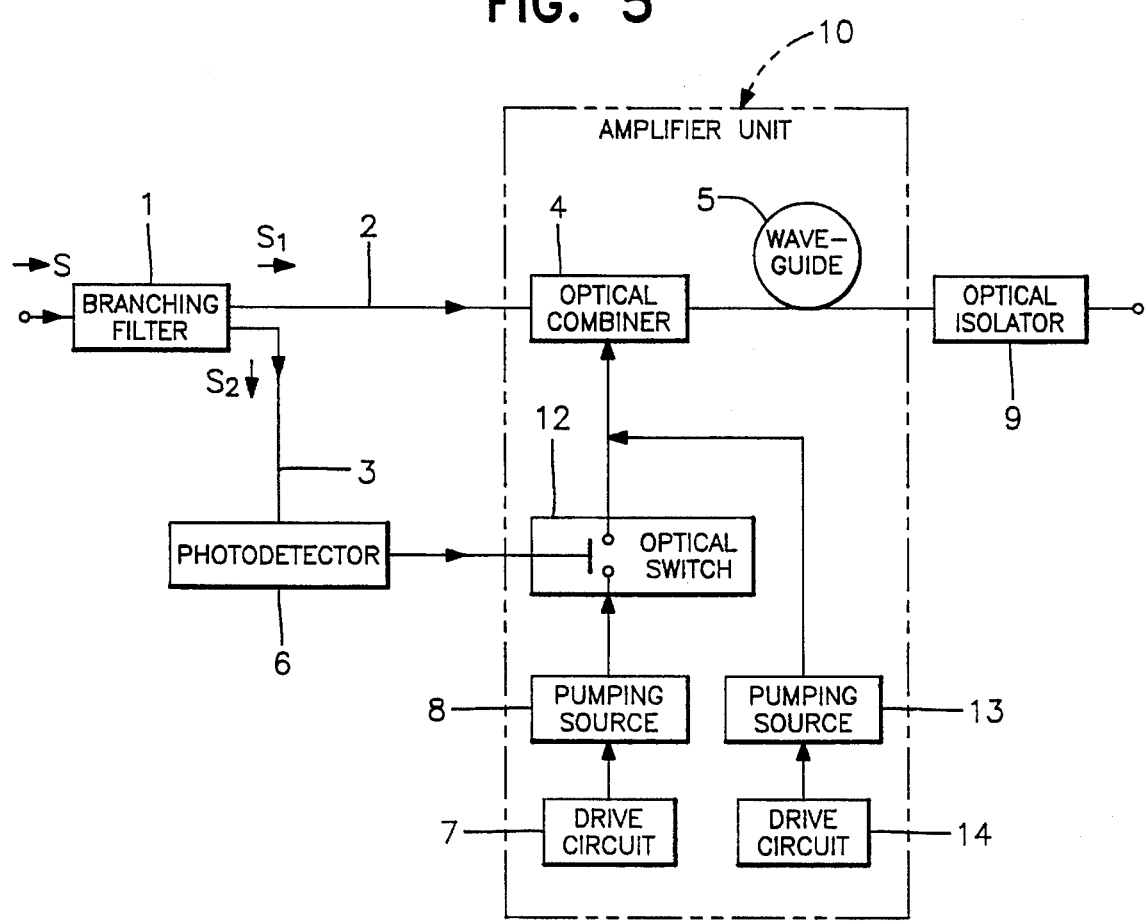
FIG. 5 is a block diagram of the second embodiment, to which certain modifications are made.

FIG. 5 is a block diagram of an embodiment obtained by modifying the second embodiment.

In this modified embodiment, the optical amplification system 10 additionally comprises an auxiliary pumping source 13 and a drive circuit 14 for in order to enhance its responsiveness for optical amplification, which pumping source 13 and drive circuit 14 are connected between the optical combiner 4 and the optical switch 12.

With this arrangement, since the optical waveguide 5 is constantly held to a weakly excited state by means of the pumping source 13 which is driven for an output level lower than that of normal operation, the optical waveguide 5 can be readily brought to a highly excited state as in the case of FIG. 3 as soon as an optical signal s1 is introduced to the optical waveguide 5 and pumped light is subsequently led to the optical waveguide 5 from the pumping source 8 as the optical switch 12 is turned on by a corresponding optical signal s2.

In this embodiment again, while auxiliary pumped light generated when a bias current is applied to the pumping source 8 has a wavelength identical with or very close to that of principal pumped light, its output level is by far lower than that of the principal pumped light because the optical waveguide 5 is only weekly excited.

A third embodiment of the invention will be described by referring to FIG. 6.

Figure 6:
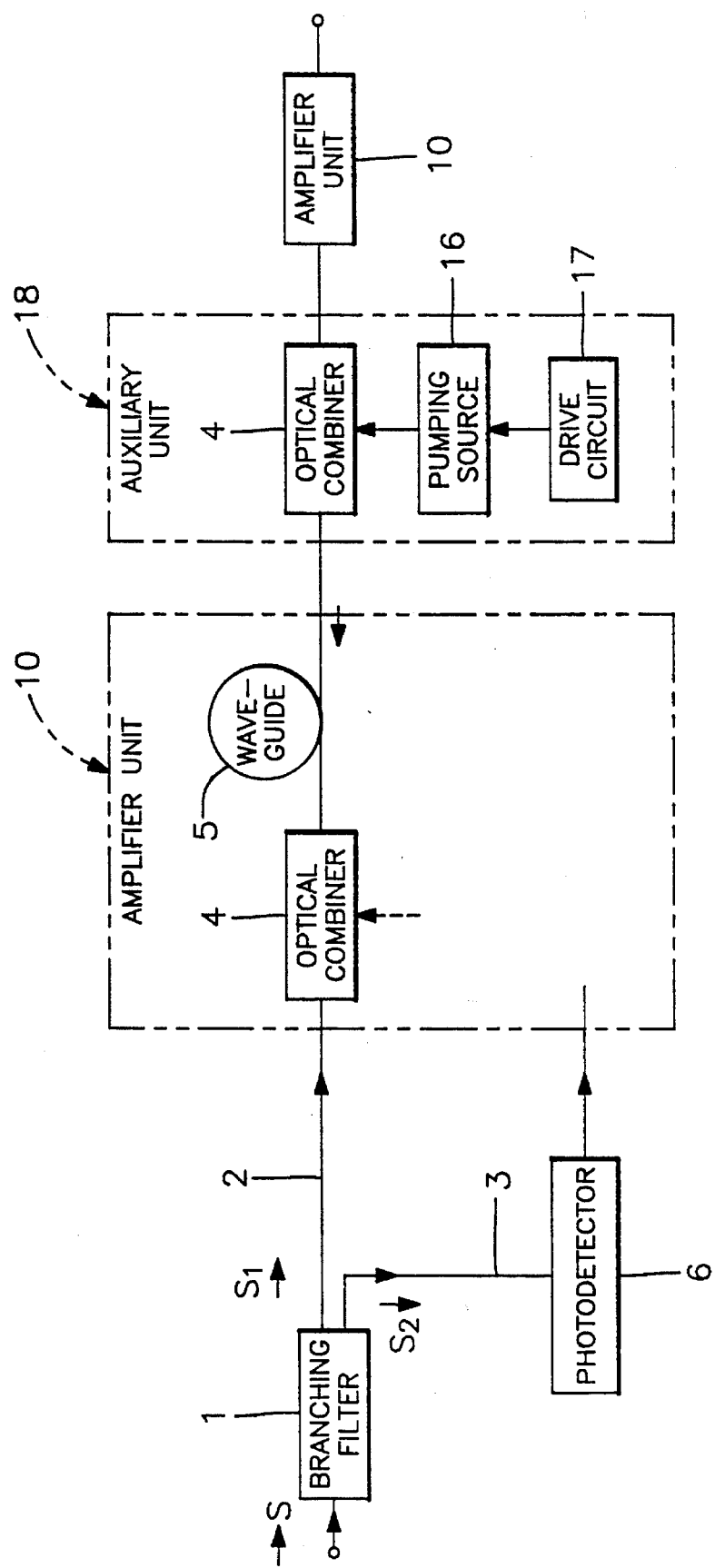
FIG. 6 is a block diagram of a third embodiment of the invention.

An optical amplification system as illustrated in FIG. 6 differs from those of FIGS. 1 and 4 in that an auxiliary unit 18 for pumping light comprising an optical combiner 15, a pumping source 16 and a drive circuit 17 is arranged downstream and connected to the optical amplifier unit 10, while its optical branching filter 1, photodetector 6 and optical amplifier unit 10 are identical with those of the system of FIG. 1 or FIG. 4.

Of the optical combiner 15, pumping source 16 and drive circuit 17 of the embodiment of FIG. 6 which are identical or similar to those of the preceding embodiments, the pumping source 16 is designed to constantly keep the optical waveguide 5 in a weakly excited state while the optical combiner 15 receives incident light directed reversely relative to the direction of transmission of signal light.

The optical amplifier unit 10 the optical amplification system of FIG. 6 operates under the control of a control optical signal s2 in a manner similar to that of its counterparts in FIGS. 1 and 4.

With this arrangement again, since the optical waveguide 5 is constantly held to a weakly excited state by means of the pumping source 16 which is driven for an output level lower than that of normal operation, the optical waveguide 5 can be readily brought to a highly excited state as in the case of FIG. 3 or FIG. 5.

The embodiment of FIG. 6 may be so modified that the auxiliary unit 18 for pumping light is arranged upstream and connected to the optical amplifier unit 10.

With such a modified arrangement, the optical combiner 15 receives incident light coming in the direction of transmission of signal light.

A fourth embodiment of the invention will be described by referring to FIG. 7.

Figure 7:
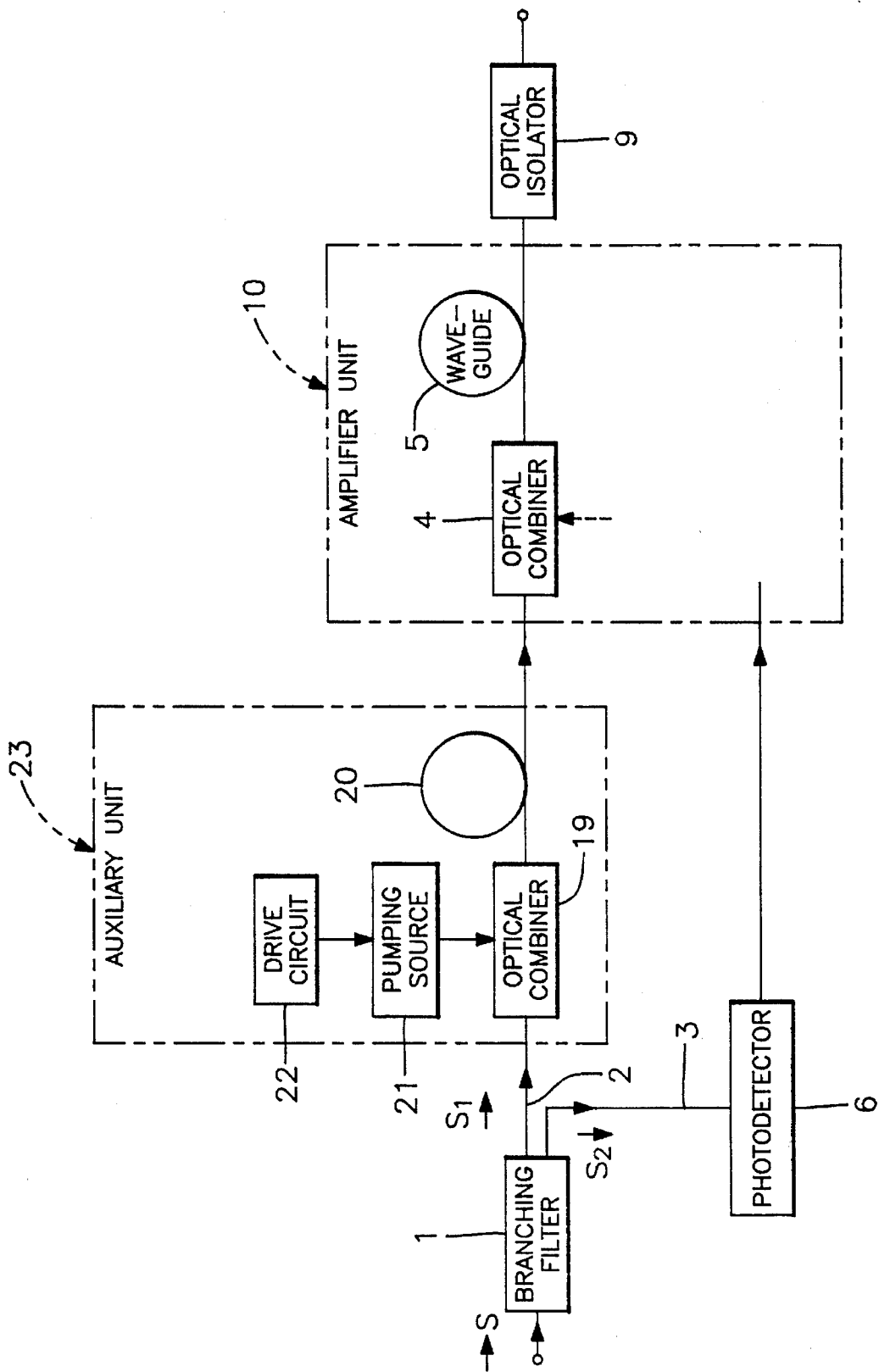
FIG. 7 is a block diagram of a fourth embodiment of the invention.

An optical amplification system as illustrated in FIG. 7 differs from those of FIGS. 1 and 4 in that an auxiliary unit 23 for optical amplification comprising an optical combiner 19, a optical waveguide 20, a pumping source 21 and a drive circuit 22 is arranged upstream and connected to the optical amplifier unit 10, while its optical branching filter 1, photodetector 6 and optical amplifier unit 10 are identical with those of the system of FIG. 1 or FIG. 4.

Of the optical combiner 19, optical waveguide 20, pumping source 21 and drive circuit 22 of the embodiment of FIG. 6 which are identical or similar to those of the preceding embodiments, the pumping source 21 is designed to constantly keep the optical waveguide 5 in a weakly excited state.

An incoming optical signal s introduced to the optical amplification system of FIG. 7 is divided into two optical signals s1 and s2 by the optical branching filter 1, which are then led to the respective optical transmission lines 2 and 3. The former signal s1 is then sent to the optical waveguide 5 by way of the optical combiner 19, the optical waveguide 20 and the optical combiner 4 while the latter signal s2 is converted to an electric signal by the photodetector 6 and applied to the optical amplifier unit 10 in the same manner as in FIG. 1 or FIG. 4.

The embodiment of FIG. 7 may be so modified that the auxiliary unit 23 for optical amplification is arranged downstream and connected to the optical amplifier unit 10. With such a modified arrangement, the optical combiner 19 receives incident light directed reversely to the direction of transmission of the optical signal s1 as illustrated in FIG. 6.

A fifth embodiment of the invention will be described by referring to FIG. 8.

Figure 8:
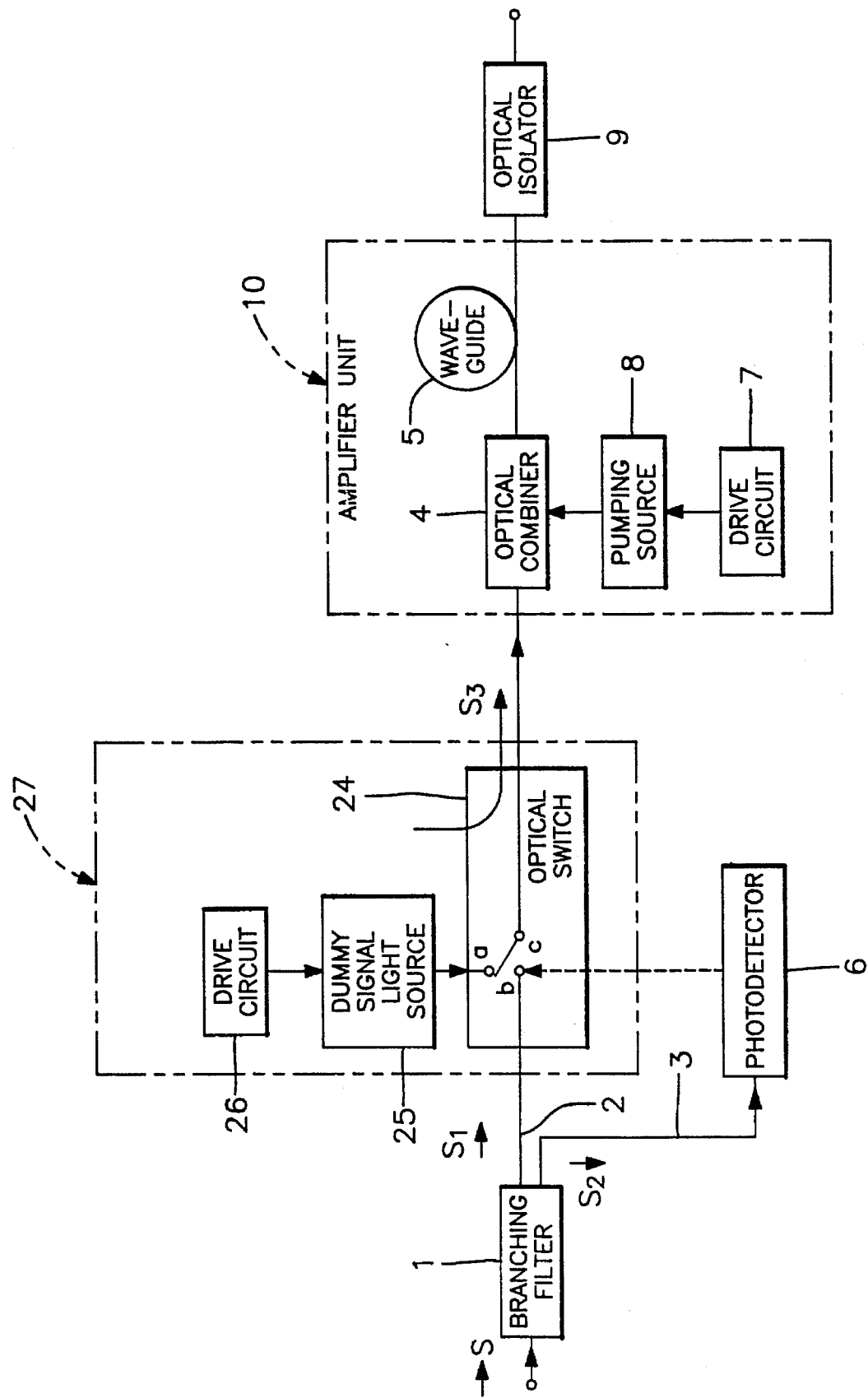
FIG. 8 is a block diagram of a fifth embodiment of the invention.
Figure 9:
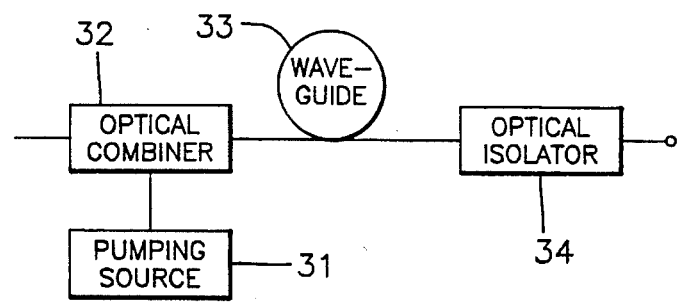
FIG. 9 is a block diagram of a conventional optical amplification system.

An optical amplification system as illustrated in FIG. 8 comprises an optical transmission route constituted by an optical branching filter 1, an optical transmission line 2, an optical switch 24, an optical waveguide 5 and an optical isolator 9 and a photoelectric conversion route constituted by the optical branching filter 1, an optical transmission line 3, a photodetector 6 and an optical switch 24, which optical switch 24 is connected to a dummy signal light source 25.

The optical waveguide 5, the pumping source 8, the drive circuit 7 constitute an optical amplifier unit 10 while the optical switch 24, the dummy signal light source 25 and the drive circuit 26 constitute an optical dummy unit 27.

The dummy signal light source 25 generates dummy signal light in the form of pulse light or continuous light having a wavelength equal to or close to that of the signal light s when it is driven by the drive circuit 26.

The inside of the optical waveguide 5 of the optical amplification system of FIG. 8 is held to a steadily excited state by the pumping source 8.

As long as no signal light s is applied to the optical amplification system, the optical switch 24 is closed at the contacts a and c so that dummy light signal s3 is fed to the optical waveguide 5 by way of the optical switch 24.

Therefore, if, for instance, there is no signal light s with 100 KH bits or more for a considerable period of time exceeding several milliseconds, the optical waveguide 5 keeps on operating under a saturated condition, constantly amplifying dummy signal light s3.

When signal light s is fed to the optical amplification system, the light signal s divided into two signal lights s1 and s2 by the optical branching filter 1, which are then transmitted through the respective optical transmission lines 2 and 3.

The signal light s2 transmitted through the optical transmission line 3 is detected and converted to an electric signal by the photodetector 6, which electric signal is then applied to the optical switch 24 to close the contacts b and c, when the signal s1 is introduced to the optical waveguide 5 which is under an excited state so that the signal s1 is properly amplified.

In other words, the optical waveguide 5 of the optical amplification system of FIG. 8 operates under a saturated condition, constantly amplifying dummy signal light s3 so that it can easily adapt itself to normal optical signal s1 that comes in to replace dummy signal light s3.

It may be needless to say that this optical amplification system does not respond either to the rising edge of an incoming optical signal s1.

The embodiment of FIG. 8 may be so modified that the optical dummy unit 27 is arranged downstream and connected to the optical amplifier unit 10.

More specifically, the optical dummy unit 27 is connected to the optical amplifier unit 10 by way of an optical combiner (as in the case of the preceding embodiment) for receiving incident light directed reversely relative to the direction of transmission of signal light s1 as illustrated in FIG. 6.

Well known backward excitation techniques and/or double side excitation techniques may be appropriately used for the purpose of the present invention in order to pump light from the fluorescent substance in the optical waveguide 5.

For receiving signal light s and pumped light by the optical amplifier unit 10 of an optical amplification system according to the invention, the signal light s may be delayed relative to the pumped light before they are fed to the optical waveguide 5.

As it may be clear flora the above description, a condition where no light signal is entered into an optical waveguide of an optical amplification system refers, for the purpose of the present invention, to cases where the existing signal light is interrupted or a succeeding signal light is not entered into the waveguide for a predetermined period of time after a preceding signal light is gone.

Since an optical amplification system according to the invention does not operate for optical amplification at the rising edge of an incoming optical signal and hence its operation is not affected by the waveform of the optical signal, it is free from the risk of destructing downstream systems and/or giving rise to a saturated state to make it a safe and stable system.

What is claimed is:

1. An optical amplification system comprising an optical amplifier unit having a silicate-glass type or fluoride-glass type optical waveguide capable of amplifying optical signals transmitted through said optical waveguide by means of the effect of optical amplification produced in the optical waveguide when pumped light is fed to said optical waveguide, said amplifier unit being operative only when in a saturated condition, pumped light being fed being to said optical waveguide only when an optical signal stream having an interval shorter than a relaxation life time of the optical waveguide is transmitted through said optical waveguide, no pumped light being fed to said optical waveguide when no optical signal stream is transmitted through said optical waveguide and when an optical signal stream having an interval longer than a relaxation life time of the optical waveguide is transmitted through said optical waveguide.

2. An optical amplification system comprising an optical amplifier unit having an optical waveguide capable of amplifying optical signals transmitted through said optical waveguide by means of the effect of optical amplification produced in the optical waveguide when pumped light is fed to said optical waveguide, wherein pumped light is constantly fed to said optical waveguide for steady excitation and a dummy optical signal is applied to the optical waveguide whenever no information bearing optical signal is transmitted through the optical waveguide whereas no dummy optical signal is applied to the optical waveguide as long as an information bearing optical signal is transmitted through the optical waveguide.

3. An optical amplification system according to claim 2, wherein the optical amplifier unit comprises an optical waveguide for optical amplification, a pumping source for generating pumped light and a drive circuit for driving said pumped source and a dummy optical signal source is arranged upstream and connected to the optical amplifier unit by way of an optical switch.

4. An optical amplification system comprising an optical amplifier unit having a silicate-glass type or fluoride-glass type optical waveguide capable of amplifying optical signals transmitted through said optical waveguide by means of the effect of optical amplification produced in the optical waveguide when pumped light is fed to said optical waveguide, said amplifier unit being operative only when in a saturated condition, pumped light being fed to said optical waveguide only when an optical signal is transmitted through said optical waveguide, no pumped light being fed to said optical waveguide when no optical signal is transmitted through said optical waveguide, activation of said optical amplification system being delayed by the relaxation life time of pumped electrons.

* * * * *

UNITED STATES PATENT AND TRADEMARK OFFICE
CERTIFICATE OF CORRECTION

PATENT NO.         : 5,589,975
APPLICATION NO.    : 08/334444
DATED              : December 31, 1996
INVENTOR(S)        : Nakamura et al.

Page 1 of 1

It is certified that error appears in the above-identified patent and that said Letters Patent is hereby corrected as shown below:

column 3, line 16, after "to" please insert --the--;

column 3, line 24, before "dummy" please insert --a--;

column 4, line 24, after "signal" please delete ".";

column 5, line 23, after "that" please insert --the--;

column 5, line 24, after "respond" please insert --to--;

column 6, line 26, after "for" please insert --it--;

column 8, line 50, please change "flora" to --from--;

In the claims, column 9, line 6, after "fed" please delete "being";

Signed and Sealed this

Fifteenth Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 5,589,975 Page 1 of 1
APPLICATION NO. : 08/334444
DATED : December 31, 1996
INVENTOR(S) : Nakamura et al.

It is certified that error appears in the above-identified patent and that said Letters Patent is hereby corrected as shown below:

Column 4, line 36, after "oxides" please insert --of yittrium-lanthanide-fluorine (YLF) crystals, transition metal ions may be added to the host glass.
Alternatively, the core of the optical waveguide 5 may be of fluoride glass of an erbium-doped ZBLAN (ZrF4-BaF2-LaF3-NaF) type or containing independently--;

Column 9, lines 7-9, please delete "stream having an interval shorter than a relaxation life time of the optical waveguide";

Column 9, line 11, please delete "stream";

Column 9, line 13, please delete "stream";

Column 9, line 15, after "waveguide" please insert --, activation of said optical amplification system being delayed by the relaxation life time of pumped electrons, and wherein, when an optical signal is transmitted through said optical waveguide, said pumped light is fed to said optical waveguide after the incidence of said optical signal--;

Column 9, line 24, please change "information bearing" to --information-bearing--; and Column 10, line 7, please change "pumped" to --pumping--.

Signed and Sealed this

Twenty-fifth Day of March, 2008

JON W. DUDAS
*Director of the United States Patent and Trademark Office*